(12) United States Patent
Jiang

(10) Patent No.: US 11,376,482 B2
(45) Date of Patent: Jul. 5, 2022

(54) GOLF BALL HITTING SYSTEM FOR TRAINING ASSISTANCE

(71) Applicant: Shanghai Baida Sports Service Co., Ltd., Shanghai (CN)

(72) Inventor: Jingwen Jiang, Shanghai (CN)

(*) Notice: Subject to any disclaimer, the term of this patent is extended or adjusted under 35 U.S.C. 154(b) by 142 days.

(21) Appl. No.: 16/800,193

(22) Filed: Feb. 25, 2020

(65) Prior Publication Data
US 2021/0060403 A1    Mar. 4, 2021

(30) Foreign Application Priority Data

Aug. 31, 2019   (CN) .......................... 201910819635.7

(51) Int. Cl.
  *A63B 69/36*   (2006.01)
  *H05B 45/60*   (2022.01)
  *H05B 45/40*   (2020.01)
  *H05B 47/105*  (2020.01)

(52) U.S. Cl.
  CPC ......... *A63B 69/3676* (2013.01); *H05B 45/40* (2020.01); *H05B 45/60* (2020.01); *H05B 47/105* (2020.01); *A63B 2225/20* (2013.01)

(58) Field of Classification Search
  CPC ............... A63B 69/36; A63B 69/3676; A63B 69/3685; A63B 69/3658; A63B 2225/20; A63B 2225/74; A63B 2225/15; A63B 2220/803; A63B 2220/805; H05B 45/40; H05B 45/60; H05B 47/105
  See application file for complete search history.

(56) References Cited

U.S. PATENT DOCUMENTS

| | | | | |
|---|---|---|---|---|
| 8,968,113 | B2 * | 3/2015 | Spelman | A63B 69/3685 473/220 |
| 9,033,811 | B2 * | 5/2015 | Bolling, Jr. | A63B 69/3632 473/221 |
| 2005/0119063 | A1 * | 6/2005 | Tupman | A63B 69/3676 473/154 |
| 2009/0181787 | A1 * | 7/2009 | Lane | A63B 69/3673 473/212 |

* cited by examiner

*Primary Examiner* — Haissa Philogene
(74) *Attorney, Agent, or Firm* — Zhihua Han; Wen IP LLC

(57) ABSTRACT

The invention discloses a golf ball hitting system for training assistance in the technical field of golf. A main control chip is controlled by a remote control server module so as to control a light-guiding line module and a laser light generator to display on the ground: a target point; a linear motion trajectory of a putter to stabilize the direction; the back swing length and the follow-through length to operate the swing amplitude of the putter; and a laser light point to guide the swing speed of a club head and stabilize the rhythm. With the assistance of the invention, the putting performance of a golfer can be effectively improved.

8 Claims, 10 Drawing Sheets

| Rolling speed | Unit base | Number of units | Proportion | Resulting distance | Back swing length | Follow-through length |
|---|---|---|---|---|---|---|
| Medium | 12 CM | 1 | 1:1 | 1Y | 12 CM | 12 CM |
| | | 1 | 1:2 | 2Y-2.5Y | 12 CM | 24 CM |
| | | 2 | 1:2 | 5Y | 24 CM | 48 CM |
| | | 3 | 1:2 | 7.5Y | 36 CM | 72 CM |
| | | 4 | 1:3 | 10Y | 36 CM | 108 CM |
| High | 12 CM | 1 | 1:1 | 1Y | 12 CM | 12 CM |
| | | 1 | 1:2 | 2Y-3Y | 12 CM | 24 CM |
| | | 2 | 1:2 | 6Y | 24 CM | 48 CM |
| | | 3 | 1:2 | 9Y | 36 CM | 72 CM |
| | | 4 | 1:3 | 12Y | 36 CM | 108 CM |

FIG. 10

GOLF BALL HITTING SYSTEM FOR TRAINING ASSISTANCE

FIELD OF THE INVENTION

The invention relates to the technical field of golf, and in particular to a golf ball hitting system for training assistance.

BACKGROUND OF THE INVENTION

Sports is a complex social and cultural phenomenon. It is a conscious, purposeful and organized social activity that promotes comprehensive development, improves physical fitness and comprehensive education level, enhances physique and exercise capacity, and improves lifestyle and quality of life, by using physical and intellectual activities as basic means according to the laws of human growth and development, skill formation, function improvement and the like. With the expansion of international exchanges, the scale and level of sports development have become an important indicator of the development and progress of a country and a society, and have also become an important means of diplomatic and cultural exchanges among countries. Sports can be divided into mass sports, professional sports, school sports and so on. Sports include factors such as sports culture, physical education, sports activities, sports competitions, sports facilities, sports organizations, and sports science and technology.

Golf balls are solid balls made of rubber, with a layer of rubber-covered wire and a layer of white paint on the surface. The balls are 42.67 mm in diameter and weigh 46 g. Golf balls can be structurally divided into single-layer balls, double-layer balls, three-layer balls and multi-shell balls, and can have three types of hardness: 90-105, 80-90 and 70. Putters are about 1 m long, and ends of clubs can be either made of wood or covered with a layer of iron sheet. "Golf" originally meant "good life in green space and fresh air", which is a sport integrated with the enjoyment of nature, physical exercise and games.

Golf is a sport with high hand-eye coordination and exertion of muscle memory. This sport can allow the sense of distance, direction and speed to be archived in the brain stem through visual observation. The brain clearly gives the cerebellum the need and purpose, and the brain stem initiates muscle coordination through nerve conduction to achieve athletic performance.

The execution of a putter depends on the proper judgment of distance and direction.

In the past, putting on the green often relied on individual talent to exert the sense of distance and direction, but with different degrees of change in physical and psychological states, under unstable and changeable physiological conditions, trainees are psychologically insecure, muscularly tense and helpless, and fail to move properly, such that club heads of putters cannot be swung in stable straight lines, and the moving direction and distance of balls are even deviated.

Currently, golf training is based on one's own sense, and the back swing length and the follow-through length of a putter cannot be accurately grasped, resulting in poor training effect and unsatisfactory progress.

SUMMARY OF THE INVENTION

Technical Problems to be Solved

For the above disadvantages existing in the prior art, the invention provides a golf ball hitting system for training assistance, which is capable of effectively overcoming the problems of poor training effect and unsatisfactory progress in the prior art due to the fact that golf training is currently based on one's own sense, and the back swing length and the follow-through length of a putter cannot be accurately grasped.

Technical Solutions

To achieve the above object, the invention is implemented by the following technical solutions.

A golf ball hitting system for training assistance comprises a main control chip, a power supply circuit, a motion processing member modular circuit, an indicator light modular circuit, a current steering modular circuit, a remote control server modular circuit, a laser light generator modular circuit and a laser guiding modular circuit; wherein the main control chip is an STM32F103C8T6 chip.

Preferably, two pins of an output terminal of a coupling inductor T in the power supply circuit are connected to a diode rectification four-arm bridge, i.e. the two pins are respectively connected between diodes D1 and D3, an output terminal of a rectifier tube four-arm bridge is connected in parallel with a capacitor C4, and one end of the output terminal is connected to an input terminal Vin of an LM1117-5 voltage stabilizing chip and the other end thereof is grounded; and a ground terminal GND of the LM1117-5 voltage stabilizing chip is grounded through the capacitor C4, and one end of an output terminal of a stabilized voltage supply is grounded, and the other end thereof is respectively connected to pins 1, 9, 24, 36 and 48 of STM32F103C8T6, a pin 1 of a motion processing member, a pin 2 of an indicator light, a pin 2 in ST1 of a current steering module, a pin 2 in ST2 of the current steering module, a pin 2 in ST3 of the current steering module, a pin 2 in ST4 of the current steering module, a pin 1 of a remote control server and a VCC pin in a laser light generator.

Preferably, pins 3, 4 and 8 of MPU6050 in the motion processing member modular circuit are respectively connected to pins 42, 43 and 32 of STM32F103C8T6, and a pin 2 of MPU6050 is grounded.

Preferably, a pin 1 in ST1 of STEERING in the current steering modular circuit is connected to a pin 16 of STM32F103C8T6, a pin 1 in ST2 of the current steering module is connected to a pin 17 of STM32F103C8T6, a pin 1 in ST3 of the current steering module is connected to a pin 18 of STM32F103C8T6, and a pin 1 in ST4 of the current steering module is connected to a pin 19 of STM32F103C8T6.

Preferably, a pin 3 of REMOT in the remote control server modular circuit is connected to a pin 2 of STM32F103C8T6, and a pin 2 of REMOT is grounded.

Preferably, a VCC pin in the laser light generator modular circuit is connected to pins 1 of LIGHT1, LIGHT2 and GUI_LIGHT, pins 2 of LIGHT1 and LIGHT2 are grounded, and a pin 2 of GUI_LIGHT is connected to DC.

Preferably, the other end of GUI_LIGHT in the light-guiding line modular circuit is connected to a pin 46 of STM32F103C8T6.

Preferably, a method for operating the golf ball hitting system for training assistance comprises the following steps:

step S1: when a main control chip controls an indicator light module to be turned on or off, the indicator light module forms a designated point on the ground to enable fixed-point training of a golf ball; and a current steering module controls the change of a guiding mode of a light-guiding line module to change the length of a straight line formed on the ground by the light-guiding line module, thereby enabling training on different back swing lengths and follow-through lengths;

step S2: the current steering module controls the change of the guiding mode of the light-guiding line module to change the length of the straight line formed on the ground by the light-guiding line module, thereby enabling training on different back swing lengths and follow-through lengths through an external remote controller regulating system;

step S3: the main control chip controls a laser light generator which starts laser at a hitting point for 3 consecutive times to remind preparation, a motion processing member module controls the laser generated by the laser light generator to move on a golf ball motion trajectory, and a putter moves along with a laser point for putting training; and step S4: the main control chip controls the light-guiding line module, the straight line formed on the ground by the light-guiding line module is the golf ball motion trajectory, and both ends of the motion trajectory are the top of back swing and the end of follow-through respectively, thereby accurately grasping the back swing length and the follow-through length of the putter during training; and the motion processing member module controls the angular velocity of the laser light generator to adjust the laser rotation angular velocity of the laser light generator, which functions to adjust the traveling speed of a light guiding point on the ground and enables training on different putting speed.

Advantageous Effects

Compared with the known public technology, the technical solutions provided by the invention has the following advantageous effects: in the invention, through the connection between a remote control server module and an external remote controller via infrared rays, the remote control server module controls the main control chip, and when the main control chip controls the indicator light module to be turned on or off, the indicator light module forms a designated point on the ground to enable fixed-point training of a golf ball; the main control chip controls the light-guiding line module, the straight line formed on the ground by the light-guiding line module is a golf ball motion trajectory, and both ends of the motion trajectory are the top of back swing and the end of follow-through respectively, thereby accurately grasping the back swing length and the follow-through length of the putter during training; and the main control chip controls the laser light generator which starts laser at a hitting point for 3 consecutive times to remind preparation, a motion processing member module controls the laser generated by the laser light generator to move on the golf ball motion trajectory, and the putter moves along with a laser point for putting training, resulting in good training effect and significant progress, wherein the indicator light module, the light-guiding line module and the laser light generator are independent, thus enabling learning in different states by the main control chip. In the invention, the motion processing member module controls the angular velocity of the laser light generator to adjust the laser rotation angular velocity of the laser light generator, which functions to adjust the traveling speed of a light guiding point on the ground and enables training on different putting speed. In the invention, the current steering module controls the change of a guiding mode of the light-guiding line module to change the length of the straight line formed on the ground by the light-guiding line module, thereby enabling training on different back swing lengths and follow-through lengths.

BRIEF DESCRIPTION OF THE DRAWINGS

In order to illustrate the technical solutions in the embodiments of the invention or in the prior art more clearly, the accompanying drawings necessary in the descriptions of the embodiments or the prior art will be simply introduced below. Apparently, the accompanying drawings in the descriptions below only involve some embodiments of the invention, and one of ordinary skill in the art can also obtain other accompanying drawings without inventive work based on these accompanying drawings.

FIG. 10 is a comparison table of the back swing length, the follow-through length and the down swing distance of the invention.

REFERENCE NUMERALS

A—hitting point; B—top of back swing; C—end of follow-through.

DETAILED DESCRIPTION OF THE INVENTION

The technical solutions in the embodiments of the invention will be clearly and completely described below in conjunction with the drawings in the embodiments of the invention. It is apparent that the described embodiments are only part of rather than all of the embodiments in the invention. Based on the embodiments of the invention, all other embodiments obtained by the ordinary persons skilled in the art without inventive work belong to the protection scope of the invention.

Figure 1:
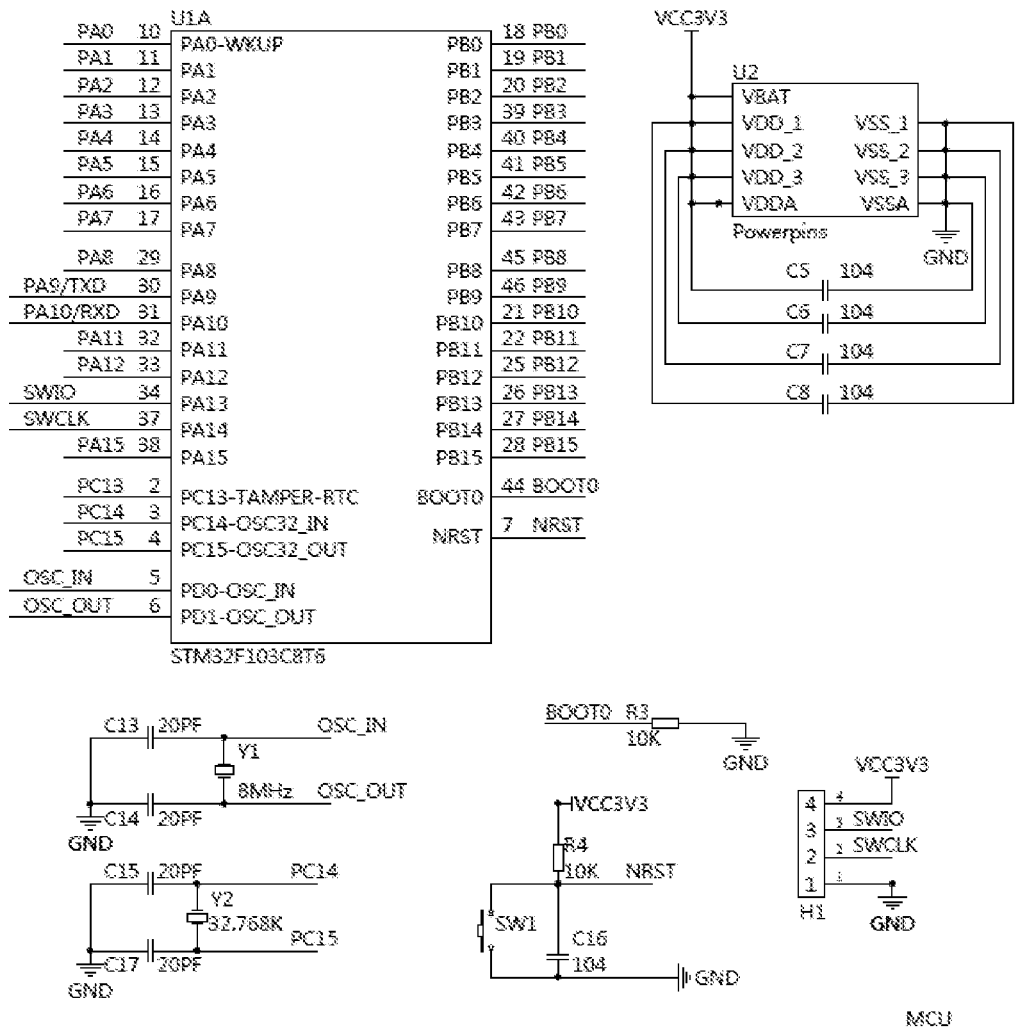
FIG. 1 is a circuit diagram of a main control chip of the invention.
Figure 2:
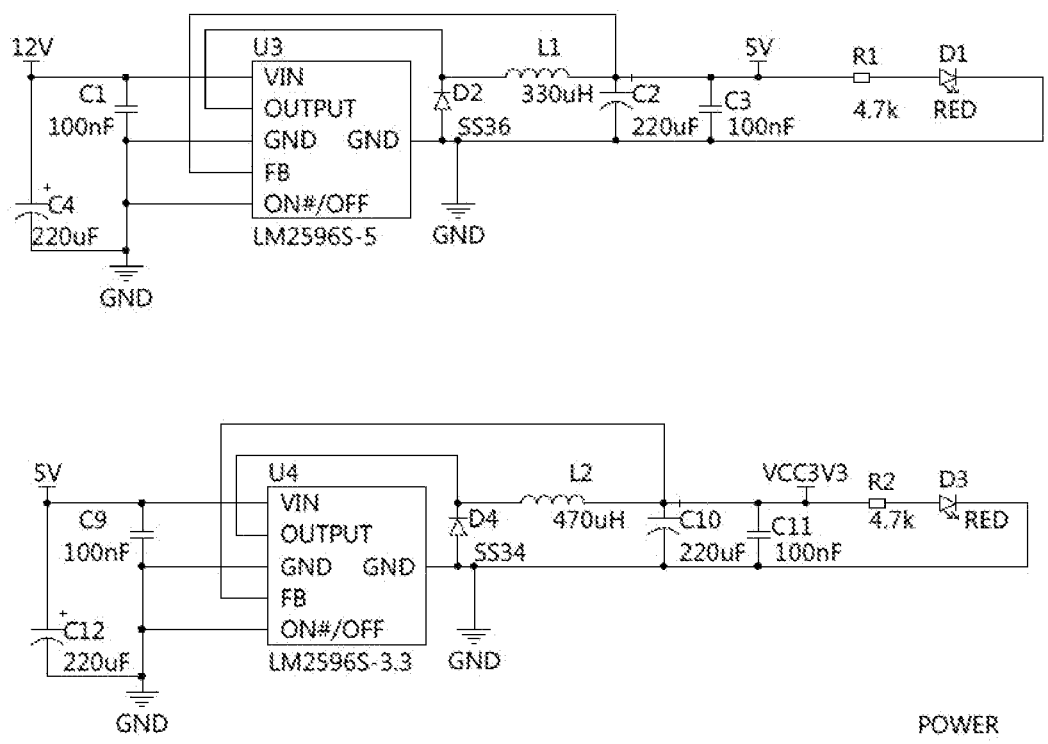
FIG. 2 is a diagram of a power supply circuit of the invention.
Figure 3:
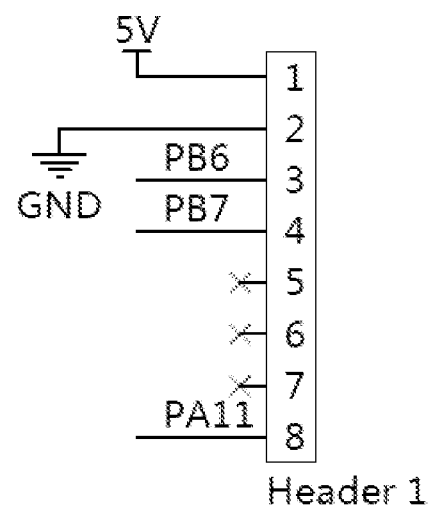
FIG. 3 is a diagram of a motion processing member modular circuit of the invention.
Figure 4:
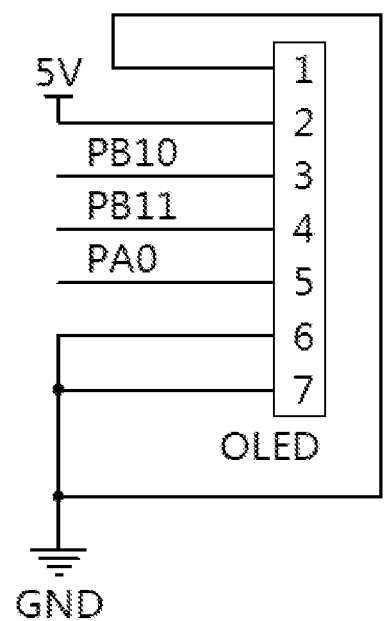
FIG. 4 is a diagram of an indicator light modular circuit of the invention.
Figure 5:
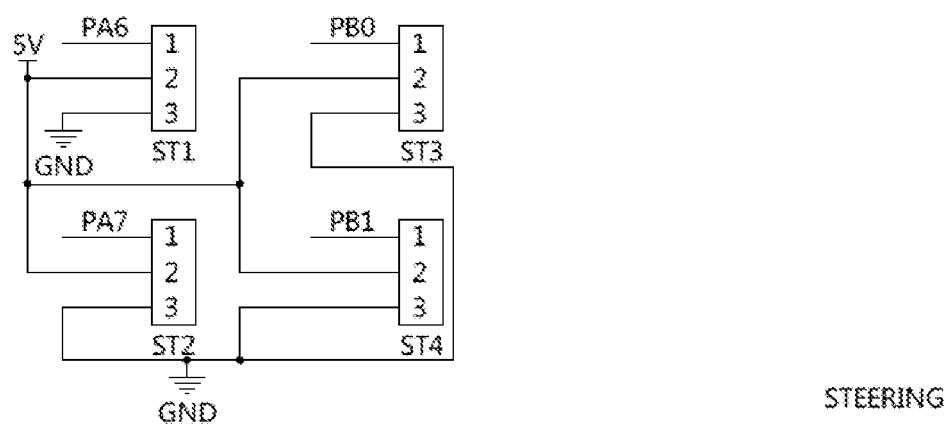
FIG. 5 is a diagram of a current steering modular circuit of the invention.
Figure 6:
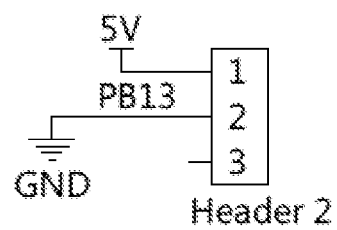
FIG. 6 is a diagram of a remote control server modular circuit of the invention.
Figure 7:
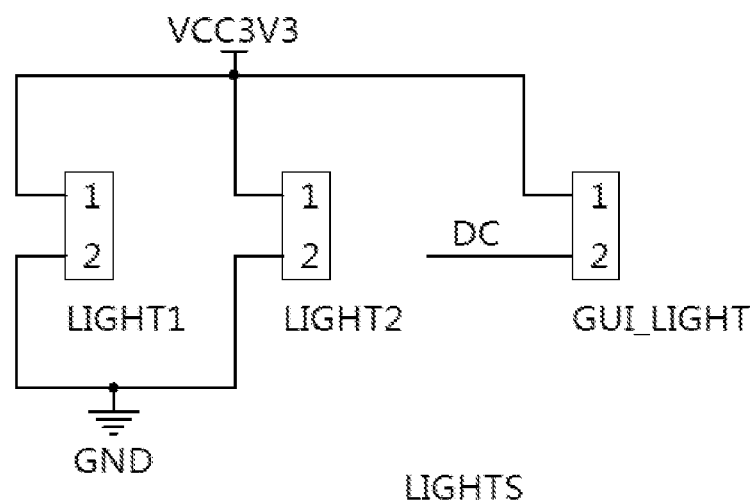
FIG. 7 is a diagram of a laser light generator modular circuit of the invention.
Figure 8:
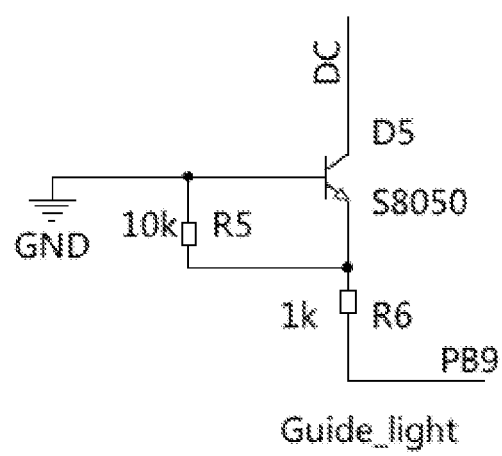
FIG. 8 is a diagram of a light-guiding line modular circuit of the invention.
Figure 9:
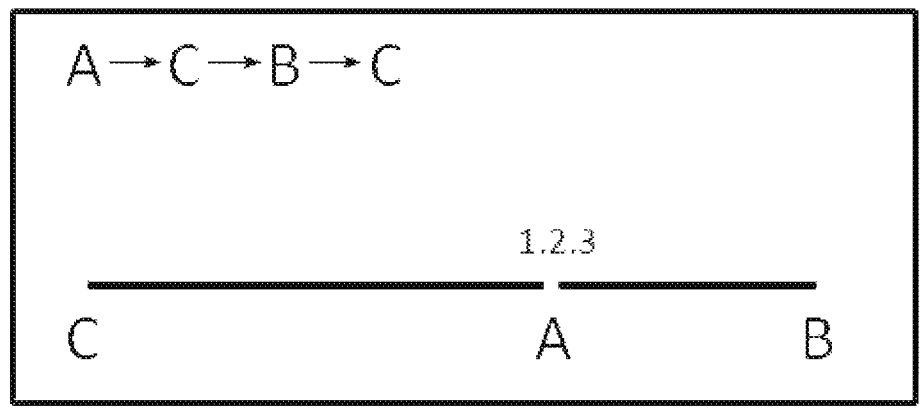
FIG. 9 is a schematic view of a laser traveling trajectory of the invention.

Referring to FIGS. 1 to 10, the invention provides a technical solution: a golf ball hitting system for training assistance comprises a main control chip, a power supply circuit, a motion processing member modular circuit, an indicator light modular circuit, a current steering modular circuit, a remote control server modular circuit, a laser light generator modular circuit and a laser guiding modular circuit; wherein the main control chip is an STM32F103C8T6 chip.

Two pins of an output terminal of a coupling inductor T in the power supply circuit are connected to a diode rectification four-arm bridge, i.e. the two pins are respectively connected between diodes D1 and D3, an output terminal of a rectifier tube four-arm bridge is connected in parallel with a capacitor C4, and one end of the output terminal is connected to an input terminal Vin of an LM1117-5 voltage stabilizing chip and the other end thereof is grounded; and a ground terminal GND of the LM1117-5 voltage stabilizing chip is grounded through the capacitor C4, and one end of an output terminal of a stabilized voltage supply is grounded, and the other end thereof is respectively connected to pins 1, 9, 24, 36 and 48 of STM32F103C8T6, a pin 1 of a motion processing member, a pin 2 of an indicator light, a pin 2 in ST1 of a current steering module, a pin 2 in ST2 of the current steering module, a pin 2 in ST3 of the current steering module, a pin 2 in ST4 of the current steering module, a pin 1 of a remote control server and a VCC pin in a laser light generator.

Pins 3, 4 and 8 of MPU6050 in the motion processing member modular circuit are respectively connected to pins 42, 43 and 32 of STM32F103C8T6, and a pin 2 of MPU6050 is grounded.

A pin 1 in ST1 of STEERING in the current steering modular circuit is connected to a pin 16 of STM32F103C8T6, a pin 1 in ST2 of the current steering module is connected to a pin 17 of STM32F103C8T6, a pin 1 in ST3 of the current steering module is connected to a pin 18 of STM32F103C8T6, and a pin 1 in ST4 of the current steering module is connected to a pin 19 of STM32F103C8T6.

A pin 3 of REMOT in the remote control server modular circuit is connected to a pin 2 of STM32F103C8T6, and a pin 2 of REMOT is grounded.

A VCC pin in the laser light generator modular circuit is connected to pins 1 of LIGHT1, LIGHT2 and GUI_LIGHT, pins 2 of LIGHT1 and LIGHT2 are grounded, and a pin 2 of GUI_LIGHT is connected to DC.

The other end of GUI_LIGHT in the light-guiding line modular circuit is connected to a pin 46 of STM32F103C8T6.

For specific applications, a structure formed of the system is mounted through a bracket and kept in a horizontal state.

A method for operating the golf ball hitting system for training assistance comprises the following steps:

step S1: when a main control chip controls an indicator light module to be turned on or off, the indicator light module forms a designated point on the ground to enable fixed-point training of a golf ball; and a current steering module controls the change of a guiding mode of a light-guiding line module to change the length of a straight line formed on the ground by the light-guiding line module, thereby enabling training on different back swing lengths and follow-through lengths;

step S2: the current steering module controls the change of the guiding mode of the light-guiding line module to change the length of the straight line formed on the ground by the light-guiding line module, thereby enabling training on different back swing lengths and follow-through lengths through an external remote controller regulating system;

step S3: the main control chip controls a laser light generator which starts laser at a hitting point for 3 consecutive times to remind preparation, a motion processing member module controls the laser generated by the laser light generator to move on a golf ball motion trajectory, and a putter moves along with a laser point for putting training; and step S4: the main control chip controls the light-guiding line module, the straight line formed on the ground by the light-guiding line module is the golf ball motion trajectory, and both ends of the motion trajectory are the top of back swing and the end of follow-through respectively, thereby accurately grasping the back swing length and the follow-through length of the putter during training; and the motion processing member module controls the angular velocity of the laser light generator to adjust the laser rotation angular velocity of the laser light generator, which functions to adjust the traveling speed of a light guiding point on the ground and enables training on different putting speed.

By use of a putting training device developed by physical mechanics and bioscience, this putting assisting device controls the rolling distance of a ball based on the motion magnitude of a club head and the pendulum speed conforming to mechanics.

Based on the back swing height of the club head as well as the putting amplitude and proportion, the friction between a club face and a ball is created to control the rolling of the ball; the kinetic energy of the club head of the putter is formatted to help establish formulation and logic during operation, and the message file and muscle memory in the brain stem after training are qualitatively and quantitatively accumulated, so that a trainee orderly makes putting motion, and is psychologically confident upon putting; and the message file in the brain after setting of a reasonable task complements that in the cerebellum, so that the trainee will naturally make a stable swing of the club head smoothly and putt the ball into a hole accurately.

This device has the following functions:

1. learners are guided to practice putting action through the guidance of a putting route and the assistance of the putting speed;

2. operating commands such as the green speed and the hitting distance can be selected to help learners practice stable putting action; and 3. imagery training can be performed after skilled practice.

(1. the swing amplitude, swing route and swing speed of the putter are guided through the setting of the assisting device, thereby affecting the rolling mode and the moving direction and distance of balls; 2. the distance setting logic is quickly understood and the basic skills of the putter is strengthened; and 3. training courses can be set through the assisting device and guided by the training device to sequentially complete training on distance, direction, rhythm, intention and the like.)

In the depiction of the present description, descriptions of reference terms such as "one embodiment", "example" and "specific example" mean that specific features, structures, materials or characteristics described in conjunction with this embodiment or example are included in at least one embodiment or example of the invention. In the present description, the schematic expressions of the above terms do not necessarily refer to the same embodiment or example. Furthermore, the specific features, structures, materials or characteristics described can be combined in any suitable manner in any one or more embodiments or examples.

The preferred embodiments of the invention disclosed above are only used to help explain the invention. The preferred embodiments neither fully describe all the details, nor limit the invention to the particular embodiments described above. Obviously, many modifications and changes can be made according to the contents of the present description. These embodiments are selected and described in the present description so as to better explain the principles and practical applications of the invention, so that those skilled in the art can better understand and use the invention. The invention is limited only by the claims and the full scope and equivalents thereof.

The invention claimed is:

1. A golf ball hitting system for training assistance, comprising a main control chip, a power supply circuit, a motion processing member modular circuit, an indicator light modular circuit, a current steering modular circuit, a remote control server modular circuit, a laser light generator modular circuit and a laser guiding modular circuit; the main control chip being an STM32F103C8T6 chip.

2. The golf ball hitting system for training assistance according to claim 1, wherein two pins of an output terminal of a coupling inductor T in the power supply circuit are connected to a diode rectification four-arm bridge, i.e. the two pins are respectively connected between diodes D1 and D3, an output terminal of a rectifier tube four-arm bridge is connected in parallel with a capacitor C4, and one end of the output terminal is connected to an input terminal Vin of an LM1117-5 voltage stabilizing chip and the other end thereof is grounded; and a ground terminal GND of the LM1117-5 voltage stabilizing chip is grounded through the capacitor C4, and one end of an output terminal of a stabilized voltage supply is grounded, and the other end thereof is respectively connected to pins 1, 9, 24, 36 and 48 of STM32F103C8T6, a pin 1 of a motion processing member a pin 2 of an indicator light, a pin 2 in ST1 of a current steering module, a pin 2 in ST2 of the current steering module, a pin 2 in ST3 of the current steering module, a pin 2 in ST4 of the current steering module, a pin 1 of a remote control server and a VCC pin in a laser light generator.

3. The golf ball hitting system for training assistance according to claim 1, wherein pins 3, 4 and 8 of MPU6050 in the motion processing member modular circuit are respectively connected to pins 42, 43 and 32 of STM32F103C8T6, and a pin 2 of MPU6050 is grounded.

4. The golf ball hitting system for training assistance according to claim 1, wherein pins 3, 4 and 5 of OLED in the indicator light modular circuit are respectively connected to pins 10, 21 and 22 of STM32F103C8T6, and pins 1, 6 and 7 of OLED are grounded.

5. The golf ball hitting system for training assistance according to claim 1, wherein a pin 1 in ST1 of STEERING in the current steering modular circuit is connected to a pin 16 of STM32F103C8T6, a pin 1 in ST2 of the current steering module is connected to a pin 17 of STM32F103C8T6, a pin 1 in ST3 of the current steering module is connected to a pin 18 of STM32F103C8T6, and a pin 1 in ST4 of the current steering module is connected to a pin 19 of STM32F103C8T6.

6. The golf ball hitting system for training assistance according to claim 1, wherein a pin 3 of REMOT in the remote control server modular circuit is connected to a pin 2 of STM32F103C8T6, and a pin 2 of REMOT is grounded.

7. The golf ball hitting system for training assistance according to claim 1, wherein a VCC pin in the laser light generator modular circuit is connected to pins 1 of LIGHT1, LIGHT2 and GUI_LIGHT, pins 2 of LIGHT1 and LIGHT2 are grounded, and a pin 2 of GUI_LIGHT is connected to DC.

8. The golf ball hitting system for training assistance according to claim 1, wherein the other end of GUI_LIGHT in the light-guiding line modular circuit is connected to a pin 46 of STM32F103C8T6.

* * * * *